(12) United States Patent
Peng

(10) Patent No.: US 8,690,479 B2
(45) Date of Patent: Apr. 8, 2014

(54) SPEEDY CONSTRUCTION METHOD FOR PENSTOCK OF LARGE SCALE HYDRAULIC TURBINE

(75) Inventor: Zhixiang Peng, Chengdu (CN)

(73) Assignee: Chengdu Alangtech Co., Ltd., Chengdu (CN)

( * ) Notice: Subject to any disclaimer, the term of this patent is extended or adjusted under 35 U.S.C. 154(b) by 357 days.

(21) Appl. No.: 13/126,301

(22) PCT Filed: Oct. 28, 2009

(86) PCT No.: PCT/CN2009/074669
§ 371 (c)(1),
(2), (4) Date: Apr. 27, 2011

(87) PCT Pub. No.: WO2010/048887
PCT Pub. Date: May 6, 2010

(65) Prior Publication Data
US 2011/0203100 A1    Aug. 25, 2011

(30) Foreign Application Priority Data

Oct. 28, 2008  (CN) .......................... 2008 1 0046399

(51) Int. Cl.
*F16L 1/26*    (2006.01)
(52) U.S. Cl.
USPC ........................................... 405/156; 29/428

(58) Field of Classification Search
USPC ...................................... 405/116, 156; 29/428
See application file for complete search history.

(56) References Cited

U.S. PATENT DOCUMENTS

| 4,540,313 A | 9/1985 | Broome |
| 4,746,244 A | 5/1988 | Broome |

FOREIGN PATENT DOCUMENTS

| CN | 2242266 Y | 12/1996 |
| CN | 200510020396.7 | 8/2005 |
| CN | 200610020101.0 | 7/2006 |
| CN | 101392518 A | 3/2009 |
| JP | 60005907 A | 1/1985 |
| JP | 61010615 A | 1/1986 |

OTHER PUBLICATIONS

Dan, "Manufacture and mounting technique of super-large penstock of Pengshui Hydropower Station", Sichuan Water Power, vol. 26, No. 6, pp. 4-7, 229, (Dec. 2007), ISSN 1001-2184.

*Primary Examiner* — Tara M. Pinnock
(74) *Attorney, Agent, or Firm* — Mei & Mark LLP

(57) ABSTRACT

A speedy construction method for the penstock of a large scale hydraulic turbine is provided. The construction sequence thereof is as follows: the spiral case of the hydraulic turbine is installed firstly, then, upwards along the water flow direction, the penstock is arranged in turn from the intake section of the spiral case. The penstock is assembled and welded on a roll welding rack or on a penstock pallet car by use of segments so as to be installed rapidly.

20 Claims, 2 Drawing Sheets

SPEEDY CONSTRUCTION METHOD FOR PENSTOCK OF LARGE SCALE HYDRAULIC TURBINE

FIELD OF THE INVENTION

Figure 1:
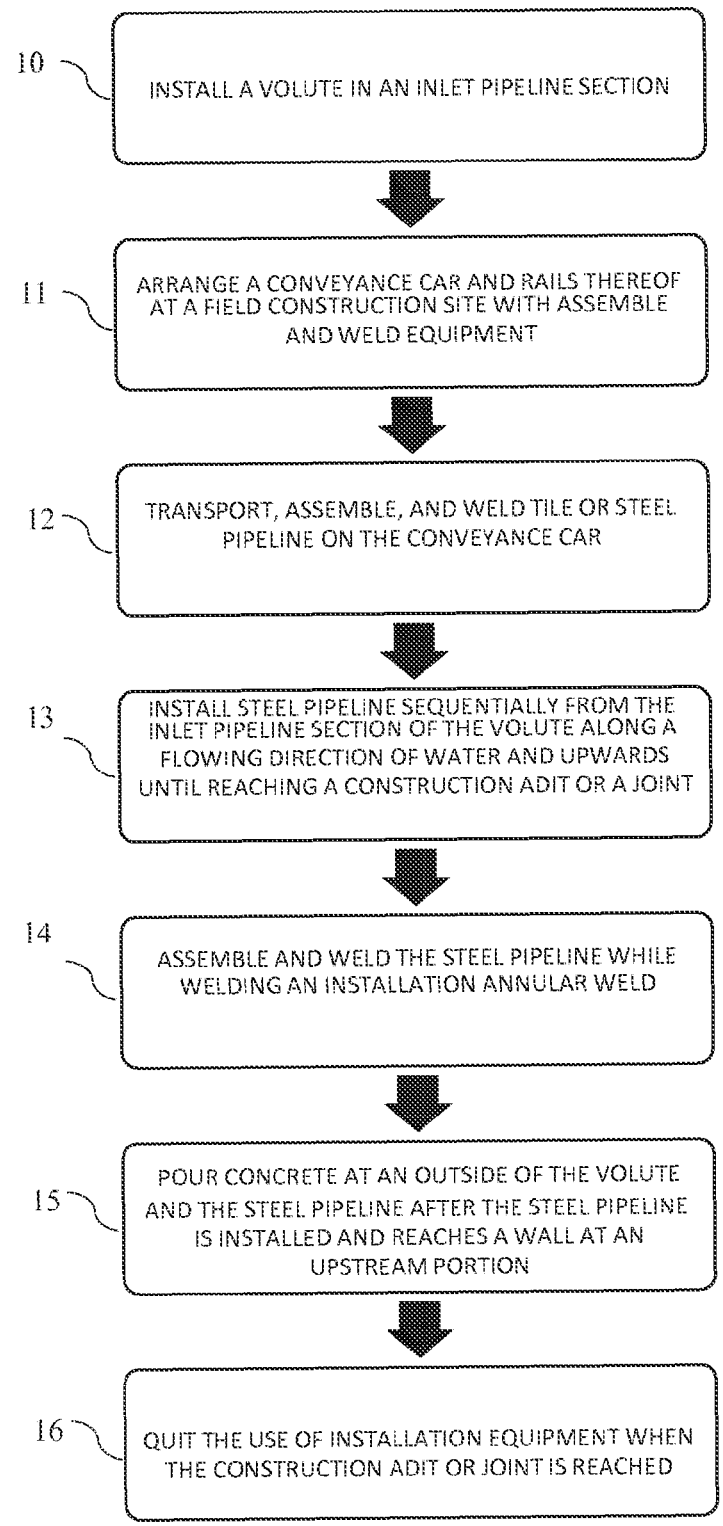

The invention relates to a construction method used for steel penstock of a large scale hydraulic turbine.

BACKGROUND OF THE INVENTION

For a long time, the construction method of steel penstock of a hydraulic turbine is: after the steel penstock is installed, concrete is poured at their outsides; meanwhile or later, a volute of the hydraulic turbine is then installed. The encased concrete is backfilled and then the volute is fixed. The remaining connecting sections between the steel penstock and the volute are installed and welded in the end, and the concrete is backfilled after they are inspected, accepted and qualified. Generally, a joint installed and welded by split tiles is adopted for short connection sections while a joint of split tiles connected with complete pipeline is adopted for long connection sections. The connection sections finally form two annular welds which are in butt weld. Limited by the method, it will cause the following problems: firstly, very strong welding shrinking stress will occur under the conditions that the two ends are restrained, thereby bring the adverse effect to the quality of the hydraulic turbine installation. The bigger the hydraulic turbine is, the stronger the adverse effect is, correspondingly. Therefore, the technical problems caused by the defects of the method can be alleviated in the prior design or construction of the hydraulic turbine at relatively high cost. Secondly, as there are installation errors between the steel pipelines and the volute which have been installed and fixed, the relatively big error will cause the size of the tiles or pipeline joints not to be effectively controlled, thereby causing difficulty for the prefabrication in a plant. Therefore, the construction period and cost of the connection sections are out of control. Thirdly, as the prior method is limited under the transport and hoisting conditions, the workers have to bear high working strength but receive low work efficiency. As for the abovementioned problems, the method that the whole section of a steel pipeline is hoisted is proposed and applied in some construction projects. Measures, such as the increases of the installation positions and dimensional precision of an outlet of the steel penstock and those of an inlet of the volute, strict control for the manufacturing quality of steel plants and so on, are adopted. However, it is needed to improve the technical standard of the installation of the pipeline at two connection openings at the two ends thereof; furthermore, prefabricated steel pipelines should strictly meet the requirements of manufacturing quality. Even so, adverse effects of the shrinkage stress under welding can not be fundamentally eliminated. In addition, it takes 30-40 days of the time limit of a project to complete the installation of one connection section. China Patent Applications No. 2005100203967 and No. 2006100201010 respectively propose a large scale steel pipe automation process and a large scale steel-pipeline trolley, which provide basic conditions to the field mechanism rapid construction of the steel penstock. But it does not relate to the installation order of the water-diversion steel pipeline. If the prior problem of the connection section between the steel pipeline and the volute is to be solved, and the manufacturing quality and construction efficiency of the water-diversion steel pipeline are further improved, the prior construction method must be improved.

SUMMARY OF THE INVENTION

The invention aims at providing a rapid construction method of steel penstock of a hydraulic turbine. It can totally eliminate the adverse effects of the shrinkage stress of girth welds on the installation and operation of the hydraulic turbine, improve the installation quality of a volute of the hydraulic turbine, shorten the installation period of the hydraulic turbine, optimize the designs of the factories of hydropower stations, tunnels and the penstock, increase the speed of the construction and reduce working strength and construction cost.

The invention is realized through the steps: a volute of a hydraulic turbine is firstly installed. Encased concrete is backfilled and the volute is fixed. A steel pipeline is installed from the part of an inlet pipeline of the volute upwards along the flowing direction of water in sequence. After the installation length of the steel pipeline reaches a side wall at the upstream of a factory, the concrete can continue to be backfilled at the outsides of the steel pipeline, or after the volute is installed and the steel pipeline is continuous to be installed and reaches the side wall at the upstream of the factory, the concrete is backfilled at the outsides of the steel pipeline together. The steel pipeline is continued to be installed forward in sequence. After one section of the steel pipeline is installed, the concrete will be poured at the section. As for the steel penstock in a cavity, after it is installed and reaches a construction adit (support part of cavity), installation equipment is quitted. As for the steel pipeline in a dam, the installation equipment is quitted when it reaches the place where is convenient for hoisting above the side wall at the upstream of the factory. Then, the joint installation between the steel pipelines is carried out. The steel pipeline can be installed with a steel-pipeline trolley. In the beginning, one end of the steel-pipeline trolley is placed at the volute inlet pipeline section, and the other end thereof is placed at the upstream section of the steel penstock.

Under the conditions that tiles are provided on site, the tiles are transported from unloading point to the steel-pipeline trolley with a small rail car. After being assembled on the steel-pipeline trolley, the tiles are automatically welded. Furthermore, the steel pipelines are positioned and installed with the steel-pipeline trolley in sequence. Under the conditions that pipelines are provided on site, the pipelines are transported from the unloading point to the steel-pipeline trolley by the small rail car or are directly hoisted on the steel-pipeline trolley. The pipelines are positioned and installed by the steel-pipeline trolley, and the steel pipelines are positioned and installed in sequence. Of course, under the conditions of hoisting, the tiles or the pipeline joints can directly be hoisted on the steel-pipeline trolley. The fixing, assembling, welding, transporting, installing and regulating of the tiles or the pipes are completed on the steel-pipeline trolley. According to different requirements of the process, the assembling and welding of the steel pipeline and the installation of single steel pipeline can be carried out on the steel-pipeline trolley; or on the steel-pipeline trolley, multiple-joint steel pipelines are assembled and welded, and a long pipeline section is installed, or an installation annular weld is welded with the steel-pipeline trolley. Automation welding is selected preferably for the wielding between the steel pipelines. High efficiency welding processes, such as full automatic shielded arc welding, $CO_2$ gas protection welding and so on, can be carried out on the steel-pipeline trolley. As for fixing pipeline annular weld, the process of all-position auto-welding or that of semi-automatic manual welding is adopted appropriately. Of course, with the character that the diameter of the front part of the connection section of the steel pipeline is relatively small, after a big-diameter section is installed, the small-diameter steel pipeline is assembled in the big-diameter steel pipeline and welded into a long section. After a volute is installed, the small-diameter long-section steel pipeline welded in advance is moved to an inlet pipeline section of the volute along the axis thereof, and the annular weld is installed, regulated and welded. Therefore, with only one long-section steel pipeline installed, the construction of the steel pipeline in the factory of a hydropower station can be completed. The method that a plurality of the pipelines are assembled and welded through a rolling welding frame or the method that tiles are assembled and welded on the steel-pipeline trolley can be adopted so that the long-section steel pipeline of this section can be assembled and welded. The joint can be provided at a gradually changing steel pipeline section with changing size and changing diameter. The concrete is poured section by section and in the order from the factory to upstream, gradually.

DRAWINGS

Figure 2:
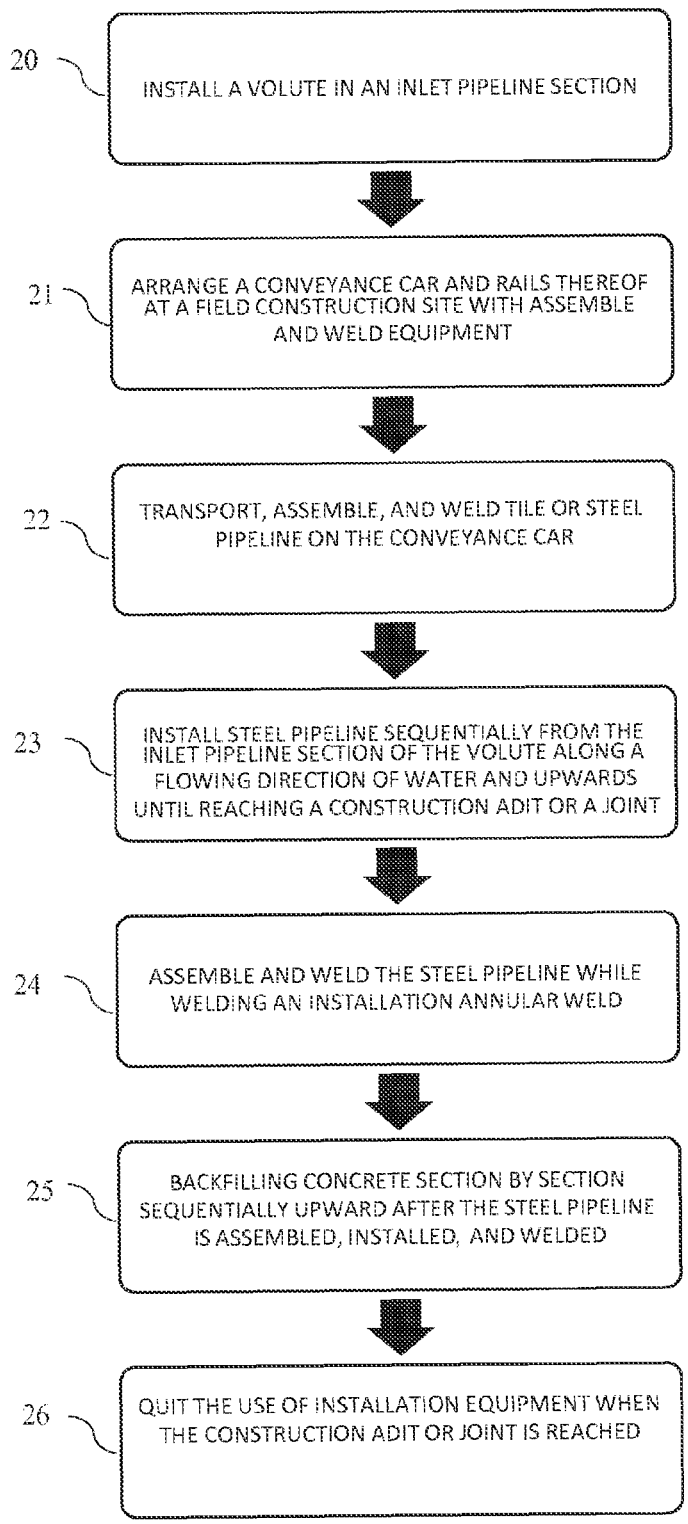

FIG. 1 is a flow diagram of a first method.
FIG. 2 is a flow diagram of a second method.

DETAILED DESCRIPTION

Compare to the prior art, the invention solves the long-standing technical problems of the connection section between a large scale steel penstock and a volute. It is not needed that joint or annular welding of whole-section steel pipeline is installed in a factory, which optimizes construction method and structure design; meanwhile, high-efficiency field mechanism construction can be utilized, which can easily control the quality and period of the steel pipeline, reduce the difficulty of the hoisting and transport of the steel pipeline and artificial labor intensity, increase production efficiency and shorten the construction time of a steel penstock and that of a hydraulic turbine set. Under normal conditions, the installation time of the steel penstock in the factory can be shortened to 5-10 days. The technique is particularly suitable for the construction of the factory of an underground hydraulic power station.

FIG. 1 shows a flow diagram for a method for construction of steel penstock. In step 10, install a volute in an inlet pipeline section. In step 11, arrange a conveyance car and rails thereof at a field construction site with assemble and weld equipment. In step 12, transport, assemble, and weld tile or steel pipeline on the conveyance car. In step 13, install steel pipeline sequentially from the inlet pipeline section of the volute along a flowing direction of water and upwards until reaching a construction adit or joint. In step 14, assemble and weld the steel pipeline while welding an installation annular weld. In step 15, pour concrete at an outside of the volute and the steel pipeline after the steel pipeline is installed and reaches a wall at an upstream portion. In step 16, quit the use of installation equipment when the construction adit or joint is reached.

FIG. 2 shows a flow diagram for another method for construction of steel penstock. In step 20, install a volute in an inlet pipeline section. In step 21, arrange a conveyance car and rails thereof at a field construction site with assemble and weld equipment. In step 22, transport, assemble, and weld tile or steel pipeline on the conveyance car. In step 23, install steel pipeline sequentially from the inlet pipeline section of the volute along a flowing direction of water and upwards until reaching a construction adit or a joint. In step 24, assemble and weld the steel pipeline while welding an installation annular weld. In step 25, backfilling concrete section by section sequentially upward after the steel pipeline is assembled, installed, and welded. In step 26, quit the use of installation equipment when the construction adit or joint is reached.

EMBODIMENTS

The invention is further described with embodiments.

Embodiment 1

The rapid construction method of a large scale underground steel penstock of a hydropower station is as follows: 1. Install a volute at an inlet pipeline section; 2. Install a steel-pipeline trolley, a small conveyor car and rails; 3. Transport tiles and assemble and weld into the steel pipeline on the steel-pipeline trolley; 4. Connect the steel pipeline with the inlet pipeline section of the volute; 5. Assemble and weld the steel pipeline circularly while an installation annular weld is welded; 6. when the steel pipeline is installed and reached a part above the upstream wall of a factory, pour concrete at the outside of the volute and the steel pipeline of the first section; 7. Assemble and weld the steel pipeline and install in a cavity along the flowing direction of water upwards, after one section of the steel pipeline is installed, backfill the concrete in the section; 8. when the steel pipeline reaches a conveyance adit, withdraw the steel-pipeline trolley and accessory equipment.

Embodiment 2

A rapid construction method of a steel penstock behind a big dam of a hydropower station is as follows: 1. Install a volute at an inlet pipeline section; 2. Install a steel-pipeline trolley as well as a small conveyance car and rails; 3. Transport tiles and then assemble and weld into the steel pipeline on the steel-pipeline trolley; 4. Connect the steel pipeline with the inlet pipeline section of the volute; 5. Assemble and weld the steel pipeline circularly while an installation annular weld is welded; 6. when the steel pipeline is installed and reaches the part above a wall at the upstream of a factory, pour concrete at the outside of the volute and the first-section steel pipeline; 7. Assemble and weld the steel pipeline and install it along the flowing direction of water. Pour concrete in one section which just has been installed; 8. When reaching the part of joint, withdraw disassemble the steel-pipeline trolley and accessory equipment.

Embodiment 3

A rapid construction method of a large scale underground steel penstock of a hydropower station is as follows: 1. Install a volute at an inlet pipeline section; 2. Pour concrete at the outsides of the volute; 3. Install a steel-pipeline trolley as well as a small conveyance car and rails thereof; 4. Transport tiles and assemble and weld into the steel pipeline on the steel-pipeline trolley; 5. Assemble and weld a plurality of the steel pipelines into the steel pipeline in a big section on the steel-pipeline trolley; 6. being connected with the inlet pipeline section of the volute, install, regulate and weld an installation annular weld; 7. when the steel pipeline is installed and reaches the part above the upstream wall of a factory, pour concrete at the outside of the volute and the first-section steel pipeline; 8. Assemble and weld the steel pipeline in a single section in a cavity and assemble, weld and install in the big section along the flowing direction of water upwards. Backfill the concrete section by section which has just been installed; 9. When the steel pipeline reaches a transport adit, withdraw the steel-pipeline trolley and accessory equipment.

Embodiment 4

A rapid construction method of a large scale underground steel penstock of a hydropower station is as follows: 1. Install a volute at an inlet pipeline section; 2. Pour concrete at the outsides of the volute; 3. Assemble and weld the steel pipeline into a long pipeline on the upstream of a penstock in advance, transport it along rails wholly and connected with the inlet pipeline section of the volute; 4. Install regulate and weld an installation annular weld 5. when the steel pipeline is installed and reaches the part above the upstream wall of a factory, pour concrete at the outside of the volute and the first-section steel pipeline; 6. along the flowing direction of water, assemble and weld the steel pipeline in a single section upwards, meanwhile assemble, weld and install in the big section. Backfill the concrete at one section which has just been installed; 7. When the steel pipeline reaches a conveyance adit or the joint, withdraw the steel pipeline installation equipment.

Embodiment 5

A rapid construction method of a large scale underground steel penstock of a hydropower station is as follows: 1. Install a volute at an inlet pipeline section; 2. Pour concrete at the outsides of the volute; 3. as for the installation and welding of a big-diameter steel pipeline, reserve one pipeline section of a gradually changing section as a joint; 4. Assemble and weld a plurality of the steel pipelines in relatively small diameter into a long pipeline which is placed in the steel pipeline in big diameter; 5. Transport the long pipeline wholly along rails and facilitate it to be connected with the inlet pipeline section of the volute, weld and install the annular weld after being installed and regulated; 6. Pour the concrete at the outside of the inlet pipeline section of the volute and the steel pipeline from downstream upwards, respectively; 7. Install the joint of the gradually changing section; 8. Weld the annular weld of the joint; 9. Withdraw the steel pipeline installation equipment; 10. Backfill the concrete along the flowing direction of water upwards section by section.

With the method that a steel penstock of a large scale hydraulic turbine has the construction order from bottom to top, the design structure of the prior steel penstock is simplified; the problem caused by a large scale steel pipeline of which the two ends thereof are restrained and welded is totally eliminated; meanwhile, the construction process of the large scale steel pipeline and the factory of a hydropower station can be optimized. With the combination of a high efficiency automatic welding process and equipment as well as the accessory equipment such as a steel-pipeline trolley, etc., the mechanization of the on-site manufacturing of the large scale steel pipeline and the automation of welding are significantly improved; under complicated circumstances, the steel pipeline is not required to be transported, hoisted and turned over any more and its positions are not needed to be changed as well; the labor intensities of hoisting, installation, welding and flaw detection are reduced; the reliability of the quality and security of the construction is increased; the installation intensity of the steel pipeline is easily enhanced and the construction cost is reduced. The installation time of the connection section of the prior large scale water-diversion steel pipeline in the factory is shortened from 30-40 days to 5-10 days, which can generate obvious economic efficiency and social values.

The invention claimed is:

1. A method for construction of a steel penstock of a hydraulic turbine comprising the steps of:
   a) installing a volute in an inlet pipeline section;
   b) arranging a conveyance car and rails thereof at a field construction site along with assembling and welding equipment of a steel pipeline;
   c) transporting, assembling, and welding steel pipeline on the conveyance car;
   d) installing steel pipeline sequentially from the inlet pipeline section of the volute along a flowing direction of water and upwards until reaching a construction adit or a joint;
   e) assembling and welding the steel pipeline while welding an installation annular weld;
   f) pouring concrete at an outside of the volute and the steel pipeline after the steel pipeline is installed and reaches a wall at an upstream portion; and
   g) quitting the use of installation equipment when the construction adit or joint is reached.

2. The method of claim 1, wherein manufacturing and installation of the steel pipeline at the field construction site is completed by adopting a pipeline automation process.

3. The method of claim 1, wherein a plurality of steel pipelines are assembled and welded into an assembled pipeline at the field construction site and the assembled pipeline is connected with the volute directly.

4. The method of claim 1, wherein tiles are transported, assembled, welded, installed and regulated with a steel-pipeline trolley.

5. The method of claim 1, wherein an assembled section is assembled and welded with a steel-pipeline trolley.

6. The method of claim 1, wherein a first section of steel pipeline is placed in second section of steel pipeline, wherein the first section of steel pipeline comprises a plurality of pipes, each of the plurality of pipes having a respective diameter, and wherein the second section of steel pipeline has a diameter greater than the sum of the respective diameters of the plurality of pipes.

7. The method of claim 6, wherein the plurality of pipes are assembled and welded at the field construction site using a rolling welding frame.

8. The method of claim 6, wherein the plurality of pipes are assembled and welded with tiles step by step on the conveyance car.

9. The method of claim 6, wherein the first section comprises a joint, wherein the joint is moved along the rails, connected with the volute, and installed at a gradually changing section, and wherein installation is completed at the field construction site using a split tile method.

10. The method of claim 1, wherein the step of transporting, assembling, and welding steel pipeline on the conveyance car further comprises transporting, assembling, and welding tile on the conveyance car.

11. A method for construction of a steel penstock of a hydraulic turbine comprising the steps of:
   a) installing a volute in an inlet pipeline section;
   b) arranging a conveyance car and rails thereof at a field construction site along with assembling and welding equipment;
   c) transporting, assembling, and welding steel pipeline on the conveyance car;
   d) installing steel pipeline sequentially from the inlet pipeline section of the volute along a flowing direction of water and upwards until reaching a construction adit or a joint;

e) assembling and welding the steel pipeline while welding an installation annular weld;
f) backfilling concrete section by section sequentially upward after the steel pipeline is assembled, installed, and welded; and
g) quitting the use of installation equipment when the construction adit or joint is reached.

12. The method of claim 11, wherein manufacturing and installation of the steel pipeline at the field construction site is completed by adopting a pipeline automation process.

13. The method of claim 11, wherein a plurality of steel pipelines are assembled and welded into an assembled pipeline at the field construction site and the assembled pipeline is connected with the volute directly.

14. The method of claim 11, wherein tiles are transported, assembled, welded, installed and regulated with a steel-pipeline trolley.

15. The method of claim 11, wherein an assembled section is assembled and welded with a steel-pipeline trolley.

16. The method of claim 11, wherein a first pipeline section is placed in a second pipeline section, wherein the first pipeline section comprises a plurality of pipes, each pipe having a respective diameter, wherein the second pipeline section comprises a diameter, and wherein the sum of the respective diameters of the pipes is less than the diameter of the second pipeline section.

17. The method of claim 16, wherein the plurality of pipes are assembled and welded at the field construction site using a rolling welding frame.

18. The method of claim 16, wherein the plurality of pipes are assembled and welded with tiles step by step on the conveyance car.

19. The method of claim 16, wherein the first pipeline section comprises a joint, wherein the joint is moved along the rails, connected with the volute, and installed at a gradually changing section, and wherein installation is completed at the field construction site using a split tile method.

20. The method of claim 11, wherein the step of transporting, assembling, and welding steel pipeline on the conveyance car further comprises transporting, assembling, and welding tile on the conveyance car.

* * * * *